United States Patent
Myong et al.

(10) Patent No.: US 6,421,216 B1
(45) Date of Patent: *Jul. 16, 2002

(54) RESETABLE OVERCURRENT PROTECTION ARRANGEMENT

(75) Inventors: Inho Myong, Newark, CA (US); Michael Brown, Clawson, MI (US); Douglas A. Burcicki, New Baltimore, MI (US); Glen A. DeGrendel, Sterling Heights, MI (US)

(73) Assignee: EWD, LLC

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/545,540

(22) Filed: Apr. 7, 2000

Related U.S. Application Data

(63) Continuation of application No. 09/356,070, filed on Jul. 19, 1999, now abandoned, which is a continuation of application No. 09/156,933, filed on Sep. 18, 1998, now abandoned, which is a continuation of application No. 08/682,067, filed on Jul. 16, 1996, now abandoned.

(51) Int. Cl.[7] ............................................. H02H 5/00
(52) U.S. Cl. ...................... 361/103; 361/93.1; 361/115
(58) Field of Search ................................ 361/103, 104, 361/106, 93.1, 115

(56) References Cited

U.S. PATENT DOCUMENTS

| | | | |
|---|---|---|---|
| 2,376,658 A | 5/1945 | Charbonneau et al. | 175/294 |
| 2,980,779 A | 4/1961 | Hickle et al. | 200/113 |
| 3,209,206 A | 9/1965 | Courtin | 317/41 |

(List continued on next page.)

FOREIGN PATENT DOCUMENTS

| | | | | |
|---|---|---|---|---|
| CH | 549 282 | 5/1974 | .......... | H01H/83/14 |
| DE | 120 564 | 6/1976 | .......... | H01H/61/01 |
| DE | 29 35 807 A1 | 4/1981 | ............ | H02H/3/08 |
| DE | 43 00 909 A1 | 7/1994 | .......... | H01H/37/52 |
| EP | 0 661 790 A2 | 7/1995 | ............ | H02H/9/02 |
| EP | 0 829 939 A2 | 3/1998 | ............ | H02H/3/08 |
| FR | 2 294 538 | 7/1976 | .......... | H01H/73/48 |
| FR | 2 653 593 | 4/1991 | .......... | H01H/51/08 |
| GB | 564 822 | 10/1944 | | |
| GB | 1 309 819 | 3/1973 | ............ | H02H/3/08 |
| GB | 2 020 904 | 11/1979 | .......... | H01H/51/34 |
| GB | 2 047 487 A | 11/1980 | ............ | H05B/3/18 |
| GB | 2 056 204 A | 3/1981 | ............ | H02H/5/04 |
| GB | 2 236 018 A | 3/1991 | .......... | H01H/61/01 |
| JP | 60224272 | 11/1985 | ............ | H01L/29/78 |
| JP | 63070576 | 3/1988 | ............ | H01L/29/78 |
| JP | 63095669 | 4/1988 | ............ | H01L/29/78 |
| JP | 64 19647 | 1/1989 | .......... | H01H/61/01 |
| JP | 3 147224 | 6/1991 | .......... | H01H/61/01 |
| JP | 6124962 | 5/1994 | ........ | H01L/21/336 |
| JP | 6275645 | 9/1994 | ........ | H01L/21/336 |
| JP | 6267982 | 5/1997 | ........ | H01L/21/336 |
| JP | 9 308077 | 11/1997 | ............ | H02H/3/08 |
| SU | 1501190 A1 | 8/1989 | .......... | H01H/71/16 |
| SU | 1742926 | 6/1992 | ............ | H02H/3/08 |

OTHER PUBLICATIONS

Search Report for International Application No. PCT/US97/11903 mailed Oct. 28, 1997.

Search Report for International Application No. PCT/US97/12571 mailed Nov. 10, 1997.

*Primary Examiner*—Stephen W. Jackson
(74) *Attorney, Agent, or Firm*—Young & Basile

(57) ABSTRACT

An overcurrent protection system giving rapid response to relatively small overcurrents has a sensor element and an interruption element in series between a power source and a load. The sensor element is functionally linked to the circuit interruption element via a control element. When current exceeds a predetermined amount, the sensor element transfers heat to the control element which causes the circuit interruption element to change from a conducting state to a non-conducting fault state. The control element may include a PTC device.

7 Claims, 1 Drawing Sheet

U.S. PATENT DOCUMENTS

| | | | |
|---|---|---|---|
| 3,840,834 A | 10/1974 | Obenhaus et al. ............. 337/79 |
| 3,846,674 A | 11/1974 | McNulty .................... 317/130 |
| 3,950,741 A | 4/1976 | Schroeder .................. 340/251 |
| 4,019,097 A | 4/1977 | Miller et al. ................. 316/93 |
| 4,237,441 A | 12/1980 | van Konynenburg et al. . 338/22 |
| 4,237,508 A | 12/1980 | Woods et al. ................ 361/24 |
| 4,238,812 A | 12/1980 | Middleman et al. ........ 361/106 |
| 4,315,237 A | 2/1982 | Middleman et al. ...... 338/22 R |
| 4,317,027 A | 2/1982 | Middleman et al. ........ 219/553 |
| 4,319,299 A | 3/1982 | Woods et al. ................ 361/24 |
| 4,426,633 A | 1/1984 | Taylor ........................ 338/25 |
| 4,450,496 A | 5/1984 | Doljack et al. .............. 361/58 |
| 4,518,850 A | 5/1985 | Grasso ....................... 219/505 |
| 4,545,926 A | 10/1985 | Fouts, Jr. et al. ........... 252/511 |
| 4,574,229 A | 3/1986 | Kim .......................... 318/788 |
| 4,635,020 A | 1/1987 | Sako ........................... 337/49 |
| 4,677,281 A | 6/1987 | Mills ......................... 219/505 |
| 4,682,133 A | 7/1987 | Kern ......................... 335/119 |
| 4,689,475 A | 8/1987 | Kleiner et al. .............. 219/553 |
| 4,724,417 A | 2/1988 | Au et al. ................. 338/22 R |
| 4,774,024 A | 9/1988 | Deep et al. ................. 252/511 |
| 4,780,598 A | 10/1988 | Fahey et al. ................ 219/511 |
| 4,785,274 A | 11/1988 | Sako et al. ................... 337/49 |
| 4,800,253 A | 1/1989 | Kleiner et al. ............... 219/553 |
| 4,808,961 A | 2/1989 | Sako et al. .................... 337/49 |
| 4,827,232 A | 5/1989 | Minks ......................... 335/78 |
| 4,845,838 A | 7/1989 | Jacobs et al. ................. 29/671 |
| 4,857,880 A | 8/1989 | Au et al. .................. 338/22 R |
| 4,859,836 A | 8/1989 | Lunk et al. ................. 219/548 |
| 4,907,340 A | 3/1990 | Fang et al. ................ 29/610.1 |
| 4,908,594 A | 3/1990 | Akiike et al. ................. 337/49 |
| 4,924,074 A | 5/1990 | Fang et al. ................. 219/548 |
| 4,935,156 A | 6/1990 | van Konynenburg et al. ......................... 219/553 |
| 4,967,176 A | 10/1990 | Horsma et al. ........... 338/22 R |
| 5,049,850 A | 9/1991 | Evans ...................... 338/22 R |
| 5,089,801 A | 2/1992 | Chan et al. ............... 338/22 R |
| 5,264,766 A | 11/1993 | Tracht et al. ................ 318/443 |
| 5,296,996 A | 3/1994 | Hansson et al. .............. 361/24 |
| 5,378,407 A | 1/1995 | Chandler et al. ........... 252/513 |
| 5,590,010 A | 12/1996 | Ceola et al. .................. 361/93 |
| 5,627,084 A | 5/1997 | Yamazaki et al. ............ 437/27 |
| 5,666,254 A | 9/1997 | Thomas et al. ................. 361/8 |
| 5,689,395 A | 11/1997 | Duffy et al. .................. 361/93 |
| 5,737,160 A | 4/1998 | Duffy ........................... 361/3 |
| 5,939,731 A | 8/1999 | Yamazaki et al. ............. 257/59 |

RESETABLE OVERCURRENT PROTECTION ARRANGEMENT

RELATED APPLICATIONS

This is a continuation of U.S. patent application filed on Jul. 19, 1999, Ser. No. 09/356,070 (now abandoned), which is a continuation of U.S. patent application Ser. No. 09/156,933 filed on Sep. 18, 1998 (now abandoned) which is a continuation of U.S. patent application Ser. No. 08/682,067 filed on Jul. 16, 1996, now abandoned.

BACKGROUND OF THE INVENTION

1. Field of the Invention

This invention relates to electrical circuit overcurrent protection.

2. Introduction to the Invention

Positive temperature coefficient (PTC) circuit protection devices are well known. The device is placed in series with a load, and under normal operating conditions is in a low temperature, low resistance state. However, if the current through the PTC device increases excessively, and/or the ambient temperature around the PTC device increases excessively, and/or the normal operating current is maintained for more than the normal operating time, then the PTC device will be "ripped," i.e. converted to a high temperature, high resistance state such that the current is reduced substantially. Generally, the PTC device will remain in the tripped state, even if the current and/or temperature return to their normal levels, until the PTC device has been disconnected from the power source and allowed to cool. Particularly useful PTC devices contain a PTC element which is composed of a PTC conductive polymer, i.e. a composition which comprises (1) an organic polymer, and (2) dispersed, or otherwise distributed, in the polymer, a particulate conductive filler, preferably carbon black. PTC conductive polymers and devices containing them are described, for example in U.S. Pat. Nos. 4,237,441, 4,238,812, 4,315,237, 4,317,027, 4,426,633, 4,545,926, 4,689,475, 4,724,417, 4,774,024, 4,780,598, 4,800,253, 4,845,838, 4,857,880, 4,859,836, 4,907,340, 4,924,074, 4,935,156, 4,967,176, 5,049,850, 5,089,801 and 5,378,407, the disclosures of which are incorporated herein by reference for all purposes.

In a batch of PTC devices made by the same manufacturing process, uncontrollable variations in the process can cause substantial variation in the conditions which will trip any individual device. The largest steady state current which will not cause any of the devices in the batch to trip is referred to herein as the "pass current" ($I_{PASS}$) or "hold current", and the smallest steady state current which will cause all of the devices to trip is referred to as the "trip current" ($I_{TRIP}$). In general, the difference between $I_{PASS}$ and $I_{TRIP}$ decreases slowly as the ambient temperature increases. Depending on the particular type of device, $I_{TRIP}$ may for example be 1.5 to 2.5 times $I_{PASS}$ at 20° C. For any individual device, the pass current and the trip current are the same. However, in this specification, reference is made to a PTC device having an $I_{PASS}$ and a different $I_{TRIP}$, because as a practical matter, the manufacturer of an electrical switch must make use of PTC devices taken from a batch of such devices. Generally, the higher the ambient temperature, the lower the pass current and the trip current. This phenomenon is referred to as "thermal derating", and the term "derating curve" is used to denote a graph of temperature against pass current.

A limitation on the known uses of PTC protection devices is that when a PTC device is placed in series with the load and sized to conduct the normal circuit current, the PTC device can take a relatively long time to convert to its tripped state on an overcurrent which is, e.g., up to a few times the normal circuit current.

SUMMARY OF THE INVENTION

The invention provides a new overcurrent protection system which will give a rapid response to even relatively small overcurrents. In the new system, a sensor element and circuit interruption element are placed in series with the load. The sensor element is functionally linked to the circuit interruption element via a control element, so that, when the current in the circuit exceeds a predetermined amount, the sensor element senses the overcurrent and communicates with the control element. The control element causes the circuit interruption element to change from a relatively conductive normal state to a relatively non-conductive fault state (including a completely open state).

In an example of a preferred embodiment of circuit arrangements of the invention, the sensor element comprises a resistive device connected in series with the load, and the control element comprises a PTC device which is thermally linked to the resistive device and is electrically connected to the circuit interruption element. When an overcurrent passes through such a system, the resistive device increases in temperature causing the PTC device to heat up and trip to its high resistance state. The PTC device is linked to the circuit interruption element so that the increased resistance of the PTC device causes the circuit interruption element to switch into its fault state. The PTC device is not placed in series with the load and therefore may operate at current levels much less than the normal circuit current which passes through the load.

The thermal linking of a resistive device with a PTC device is known in the art. A current to be measured and/or controlled passes through the resistive device. $I^2R$ heating of the resistive device causes the PTC device to heat up and its resistance increases accordingly. Such resistive devices may comprise resistors, heaters, high resistance wire (e.g. NiChrome), PTC devices and the like. It is known that in order to obtain the desired current/temperature performance of such combinations, certain characteristics of the resistive device must be controlled, particularly in the zone adjacent to the PTC device. Some of the characteristics to be controlled include the resistivity, shape and cross sectional area of the material. The resistive device should be chosen to minimize system impedance while achieving sufficient temperature rise under overcurrent conditions to cause the PTC device to heat up and trip to its high impedance state.

In a first aspect, this invention provides an electrical protection system which can be connected between an electrical power supply and an electrical load to form an operating circuit, the operating circuit having an on state and an off state and comprising a current carrying line and a return line, and which when so connected protects the circuit from overcurrents, the system having a normal operating condition and a fault condition, and comprising:

a. a circuit interruption element, which, when the system is so connected, is connected in series between the power supply and the load, and has (1) a closed state which permits the flow of a normal current, $I_{NORMAL}$ when the system is in the normal operating condition, and (2) an open state which permits the flow of at most a reduced current, substantially less than $I_{NORMAL}$ when the system is in the fault condition;

b. a sensor element, which, when the system is so connected, is connected in series with the circuit interruption element and the load, and has
   (1) a normal state, when the current in the system does not exceed the normal current, $I_{NORMAL}$ by a predetermined current amount, and
   (2) a fault state, when the current in the system exceeds the normal current, $I_{NORMAL}$, by the predetermined amount; and
c. a control element, which, when the system is so connected, is coupled with the sensor element and with the circuit interruption element, and has a variable resistance which
   (1) is low when the sensor element is in the normal state, and
   (2) increases by at least a predetermined resistance amount when the sensor element is in the fault state;

the circuit interruption element changing from its closed state to its open state, thereby causing the system to change from its normal operating condition to its fault condition, when the resistance of the control element has increased by the predetermined resistance amount in response to the sensor element changing from its normal state to its fault state.

In a second aspect, the invention provides an electrical protection system which can be connected between an electrical power supply and an electrical load to form an operating circuit, the operating circuit having an on state and an off state and comprising a current carrying line and a return line, and which when so connected protects the circuit from overcurrents, the system having a normal operating condition and a fault condition, and comprising:

a. a circuit interruption element, which, when the system is so connected, is connected in series between the power supply and the load, and has
   i. a closed state which permits the flow of a normal current, $I_{NORMAL}$ when the system is in the normal operating condition, and
   ii. an open state which permits the flow of at most a reduced current, substantially less than $I_{NORMAL}$ when the system is in the fault condition;
b. a sensor element, which has a variable resistance, and which when the system is so connected, is connected in series with the circuit interruption element and the load, and has
   i. a normal state, in which its resistance is low, when the current in the system does not exceed the normal current, $I_{NORMAL}$, by a predetermined current amount, and
   ii. a fault state, in which its resistance increases by at least a predetermined resistance amount, when the current in the system exceeds the normal current, $I_{NORMAL}$ by the predetermined amount; and
c. a control element, which, when the system is so connected, is coupled with the sensor element and with the circuit interruption element, which causes the circuit interruption element to change from its closed state to its open state when the sensor element changes from its normal state to its fault state.

It will be apparent that polymeric PTC devices, ceramic PTC devices, other PTC devices such as bimetal devices, metallic PTC devices, arrangements of solid state devices with PTC characteristics, and devices displaying similar characteristics may be used in the circuit arrangements of this invention to provide reliable overcurrent protection. It will likewise be apparent to those of ordinary skill in the art that mechanical switches used in the circuit arrangements of this invention may include switches, relays, circuit breakers, isolators, bimetal devices and other devices. In addition, a solid state device or combination of solid state devices which provide disconnecting characteristics similar to those provided by mechanical switches may be used in place of the mechanical switches. Bimetal devices have also been referred to as bimetallic devices, electrothermal relays, thermally activated switches and/or electrothermal mechanisms with bimetal elements.

It will be apparent that in the preferred embodiments, this invention permits the use of PTC devices and bimetal switches to be arranged with mechanical switches and other electrical devices to provide reliable protection which protection was not previously available in the art. These and other features, objects and advantages will be understood or apparent to those of ordinary skill in the art from the following detailed description of the preferred embodiments of the invention as illustrated in the various drawing figures.

BRIEF DESCRIPTION OF THE DRAWINGS

For a better understanding of the nature and objects of the invention, reference should be had to the following detailed description of the preferred embodiments of the invention, taken in conjunction with the accompanying drawings, in which like components are given the same reference numerals in each FIG. in which they appear, and in which.

DETAILED DESCRIPTION OF THE INVENTION

Figure 1:
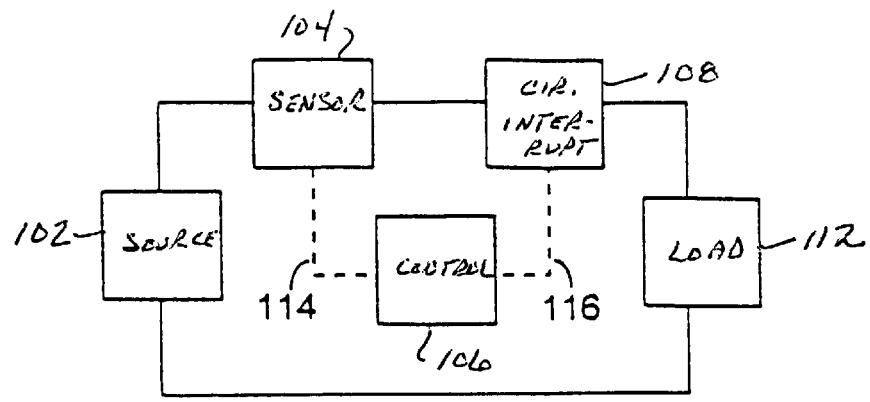
FIG. 1 is a block diagram of a circuit using the first embodiment of the invention.

Overcurrent protection circuits arranged in accordance with the principles of this invention generally perform the functions of sensing the current, issuing a control signal to interrupt the circuit, interrupting the circuit and partially or completely isolating the load from the power source. The overcurrent protection circuits may be viewed as comprising operational elements which work cooperatively to perform the overcurrent protection functions. FIG. 1 is a block diagram showing an arrangement of such operational elements.

Five operational elements depicted in FIG. 1 are the source 102, sensor element 104, control element 106, circuit interruption element 108 and load 112. The source 102 provides the electrical power to the circuit, and the load 112 performs the intended purpose of the circuit. The sensor element 104 senses the current and determines whether the current delivered to the load 112 is within a normal acceptable range. When the sensor element 104 determines that the current delivered to the load 112 is excessive, the sensor element 104 informs the control element 106 via a first link 114 between the sensor 104 and control 106 elements. Based on information received from the sensor element 104, the control element 106 controls the state of the circuit interruption element 108 via a second link 116 between the control 106 and interrupt 108 elements. The circuit interruption element 108 interrupts current in the circuit upon receipt of a control signal from the control element 106 when the sensor element 104 senses an overcurrent in the circuit.

Figure 2:
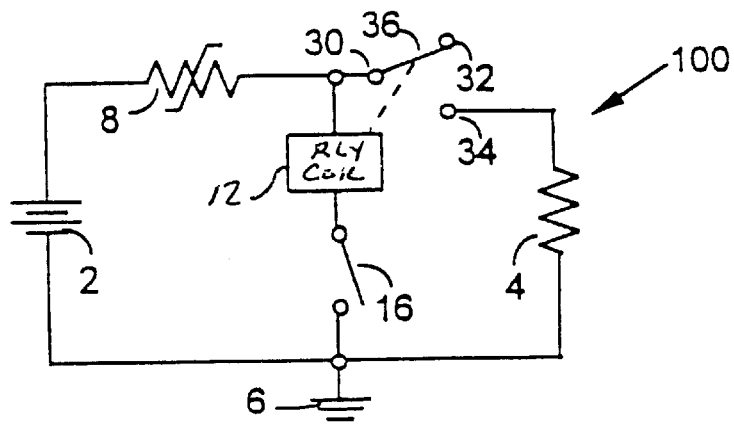
FIG. 2 shows a circuit diagram of an overcurrent protection circuit of the invention.

FIG. 2 shows an example of an overcurrent protection arrangement of the invention 100. The arrangement 100 in FIG. 2 comprises an electrical power source 2, a load 4, a PTC device 8, a relay coil 12 with associated relay contacts 30 32 34 36 including a center contact 30, a normally closed contact 32, a normally open contact 34 and a wiper 36, and an ON/OFF switch 16. With the ON/OFF switch 16 initially open, the PTC device 8 in its low resistance state, and the wiper 36 against the normally closed contact 32, the circuit 100 is in an open state and there is no current through the load 4. When the ON/OFF switch 16 is closed, a small amount of current is drawn through the relay coil 12, thereby energizing the relay coil 12 and causing the wiper 36 to move from the normally closed contact 32 to the normally open contact 34, thereby placing the load 4 in the circuit The PTC device 8 is placed in series with the parallel combination of the relay coil 12 and the load 4. However, the relay coil 12 draws very little current to keep it energized. In case of an overcurrent, the resistance of the PTC device 8 increases, thereby reducing the current to the load 4 and the relay coil 12. If the PTC device 8 is chosen properly, its resistance would increase sufficiently to reduce the current through the relay coil 12 enough to deenergize the relay coil 12 thereby causing the wiper 36 to move to the normally closed contact 32 and disconnect the load 4. If the current through the PTC device 8 and relay coil is 12 sufficient to keep the PTC device 8 tripped in the high impedance state and the relay coil 12 deenergized, the circuit 100 remains in a fault state until the ON/OFF switch 16 is opened and the PTC device 8 allowed to cool. If the current through the PTC device 8 in the high impedance state is not sufficient to keep the PTC device 8 tripped, then the PTC device 8 would cool and reset to its low impedance state. This would allow the current through the relay coil 12 to increase and energize the relay coil 12, thereby moving the wiper 36 to the normally open contact 34. If the cause of the fault is still present, then the cycle would continue until the cause of the fault were removed or power were removed, e.g. by opening the ON/OFF switch 16.

However, since the normal circuit current may be many hundred times the current drawn by the relay coil 12, there is a potential for the PTC device 8 to increase in its resistance and reduce the current to the load 4, but not reduce the current sufficiently to cause the relay coil 12 to deenergize. This could leave the circuit in a closed state with a fault condition. For example, a PTC device rated to carry 9 amps would typically carry a current of approximately 0.25 amps in the tripped state. Since a typical automotive relay coil current is 0.180 amps, even if the PTC device were tripped, there would still be sufficient current to keep the relay energized. Thus, circuit protection arrangements like that depicted in FIG. 2 would likely require the use of PTC devices with potentially quite precise tolerances.

Therefore, it would be preferred to have a circuit protection arrangement in which the PTC device is not placed in the circuit in a position in which the current to both the circuit load and the device controlling the circuit interruption device passes through the PTC device.

Figure 3:
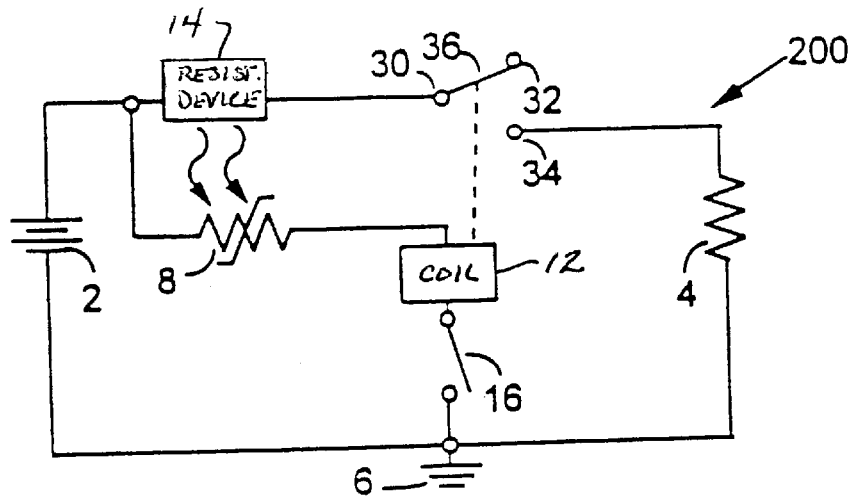
FIG. 3 is an examples of the circuit of FIG. 1 employing PTC devices.

The circuit in FIG. 3 is an example of an overcurrent protection system in accordance with the fist embodiment of the invention and the block diagram depicted in FIG. 1. FIG. 3 shows an overcurrent protection circuit 200 employing a certain arrangement of a PTC device 8 with a resistive device 14, a relay coil 12, a set of contacts 30 32 34 36 and an ON/OFF switch 16. In the circuit 200, the resistive device 14 is placed in series with the load 4 and the PTC device 8 is placed in series with the relay coil 12, with the latter series combination connected across the power source 2. With the ON/OFF switch 16 initially open, the PTC device 8 in its low resistance state, and the wiper 36 against the normally closed contact 32, the circuit 200 is in an open state and there is no current through the load 4. When the ON/OFF switch 16 is closed, a small amount of current is drawn through the PTC device 8 and the relay coil 12, thereby energizing the relay coil 12 and causing the wiper 36 to move from the normally closed contact 32 to the normally open contact 34, thereby placing the load 4 in the circuit. The resistive device 14 and the PTC device 8 are thermally linked, so that in case of an overcurrent in the circuit, the temperature of the resistive device 14 increases and causes the PTC device 8 to heat up to its trip temperature and change to its high impedance state. With the PTC device 8 in its high impedance state, the current through the relay coil 12 reduces, the relay coil 12 deenergizes and causes the wiper 36 to move back to the normally closed contact 32. The resistive device 14 and PTC device 8 have a combined mass such that the trickle of current through the PTC device 8 and relay coil 12 is not sufficient to keep the temperature of the PTC device 8 high enough to keep the PTC device 8 in the tripped state. Thus, the resistive device 14 and PTC device 8 both cool. When the PTC device 8 cools sufficiently, it resets to its low impedance state and allows sufficient current to again flow through the relay coil 12 to energize the relay coil 12 and move the wiper 36 to the normally open contact 34. If the cause of the overcurrent remains, the resistance device 14 will heat and the PTC device 8 will again trip to its high impedance state. This cycle continues until either the cause of the overcurrent is removed or power is removed, for example by opening the ON/OFF switch 16.

What is claimed is:

1. An electrical protection system which can be connected between an electrical power supply and an electrical load to form an operating circuit, the operating circuit having an on state and an off state and comprising a current carrying line and a return line, and which when so connected protects the circuit from overcurrents, the system having a normal operating condition and a fault condition, and comprising:

a. a circuit interruption element which, when the system is so connected and is in its normal operating condition, is connected in series between the power supply and the load so that an operating current passes through the circuit interruption element and the load, and which has i. a closed state which permits the flow of a normal operating current between the power supply and the load when the system is in the normal operating condition, and ii. an open state which permits the flow of substantially no operating current between the power supply and the load, when the system is in the fault condition, b. a sensor element, which, when the system is so connected and is in its normal operating condition, is connected in series with the circuit interruption element and the load so that the operating current passes through the circuit interruption element, the sensor element and the load, wherein the sensor element comprises a heat-generating device for generating heat in the fault state, and which has i. a normal state, when the operating current in the system does not exceed the normal operating current by a predetermined amount; and ii. a fault state, when the operating current in the system exceeds the normal operating current by a predetermined amount; and c. a control element, which, when the system is so connected is responsively coupled with the sensor element and is controllably coupled with the circuit interruption element and has an electrical characteristic which i. is low impedance when the sensor element is in the normal state, ii. is high impedance when the sensor element has the fault state; the circuit interruption element changing from its closed state to its open state, thereby causing the system to change from its normal operating condition to its fault condition when the sensor element has the fault state.

2. A system according to claim 1 wherein the circuit interruption element set of relay contacts.

3. A system according to claim 2 wherein the control element comprises a series combination of
   a. a PTC device thermally coupled with the heat-generating device and having a low resistance providing the low impedance when the sensor element is in the normal state and having a high resistance providing the high impedance when the sensor element is in the fault state; and
   b. a relay coil coupled to operate the relay contacts; the series combination being connected across the power supply between the current carrying line upstream of the sensor element and load, and the return line, with the PTC device connected to the current carrying line and the relay coil coupled to the return line.

4. A system according to claim 3 comprising:
   a. means, when the operating circuit is in the off state, to change the circuit to the on state; and
   b. means, when the operating circuit is in the on state, to change the circuit to the off state.

5. A system according to claim 4 wherein the circuit interruption element is connected between the sensor element and the load.

6. A system according to claim 5 wherein the means to change the circuit from the off state to the on state and the means to change the circuit from the on state to the off state comprises a switch connected in series with the PTC device.

7. A system according to claim 5 wherein the means to change the circuit from the off state to the on state and the means to change the circuit from the on state to the off state comprises a switch connected in the return line.

* * * * *